United States Patent
Feng et al.

(10) Patent No.: US 10,777,019 B2
(45) Date of Patent: Sep. 15, 2020

(54) METHOD AND APPARATUS FOR PROVIDING 3D READING SCENARIO

(71) Applicant: Baidu Online Network Technology (Beijing) Co., Ltd., Beijing (CN)

(72) Inventors: Miaomiao Feng, Beijing (CN); Wen Hou, Beijing (CN); Bingbing Li, Beijing (CN); Qinglong Li, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 0 days.

(21) Appl. No.: 16/134,554

(22) Filed: Sep. 18, 2018

(65) Prior Publication Data
US 2019/0122446 A1 Apr. 25, 2019

(30) Foreign Application Priority Data
Oct. 23, 2017 (CN) .......................... 2017 1 0993954

(51) Int. Cl.
*G06T 19/20* (2011.01)
*G06F 3/01* (2006.01)
(Continued)

(52) U.S. Cl.
CPC .............. *G06T 19/20* (2013.01); *G06F 3/011* (2013.01); *G06F 3/0483* (2013.01); *G06F 3/04815* (2013.01); *G06T 2219/2024* (2013.01)

(58) Field of Classification Search
CPC .................................................. G06T 19/006
See application file for complete search history.

(56) References Cited

U.S. PATENT DOCUMENTS 7,162,197 B2 * 1/2007 Kitamura ............... A63H 33/38
434/317
7,315,312 B2 1/2008 Hemmings
(Continued)

FOREIGN PATENT DOCUMENTS

CN 105760066 A 7/2016
CN 105955452 A 9/2016
(Continued)

*Primary Examiner* — Phong X Nguyen
(74) *Attorney, Agent, or Firm* — Miller, Matthias & Hull LLP

(57) ABSTRACT

An object of this disclosure is to provide a technology for providing 3D reading scenarios. The technology includes: acquiring, in a VR reading mode, corresponding 3D scenario information based on a literature work currently read by a user; and establishing, in cooperation with VR glasses, a 3D reading scenario for the literature work based on the 3D scenario information. Compared with the existing technologies, this disclosure can acquire the corresponding 3D scenario information based on the literature work, and establish the 3D reading scenario for the literature work using the 3D scenario information. Moreover, this disclosure in cooperation with VR glasses further realizes an immersed reading experience by reading literature works in a 3D scenario. This not only improves the monotone disadvantage of the traditional reading scenario, but also brings users into an immersed reading environment in the reading process, and greatly enhances the users' reading experience.

16 Claims, 2 Drawing Sheets

(51) Int. Cl.
*G06F 3/0483* (2013.01)
*G06F 3/0481* (2013.01)

(56) References Cited

U.S. PATENT DOCUMENTS

| | | | | |
|---|---|---|---|---|
| 9,330,271 | B1* | 5/2016 | Shams | G06F 21/606 |
| 10,169,921 | B2* | 1/2019 | Jayaraj | H04N 7/188 |
| 2005/0066288 | A1 | 3/2005 | Hemmings | |
| 2012/0176516 | A1* | 7/2012 | Elmekies | H04N 5/265 |
| | | | | 348/239 |
| 2014/0002442 | A1* | 1/2014 | Lamb | G06F 3/1431 |
| | | | | 345/419 |
| 2014/0210855 | A1* | 7/2014 | Cohen | G06F 16/44 |
| | | | | 345/633 |
| 2014/0223279 | A1* | 8/2014 | Algreatly | G11B 27/28 |
| | | | | 715/233 |
| 2015/0097767 | A1* | 4/2015 | Park | G06T 19/006 |
| | | | | 345/156 |
| 2015/0302651 | A1* | 10/2015 | Shpigelman | G06T 19/006 |
| | | | | 345/633 |
| 2015/0331240 | A1* | 11/2015 | Poulos | G02B 27/017 |
| | | | | 345/8 |
| 2015/0332515 | A1* | 11/2015 | Elmekies | G06F 3/017 |
| | | | | 345/419 |
| 2016/0142773 | A1* | 5/2016 | Terui | H04N 21/2387 |
| | | | | 725/14 |
| 2016/0225187 | A1* | 8/2016 | Knipp | G06T 19/006 |
| 2018/0059775 | A1* | 3/2018 | Shafer | G06F 3/011 |
| 2018/0081448 | A1* | 3/2018 | Woo | G06F 3/046 |
| 2018/0113505 | A1* | 4/2018 | Choi | G02B 27/017 |
| 2018/0137681 | A1* | 5/2018 | Chang | G06F 3/011 |
| 2018/0292665 | A1* | 10/2018 | Al Zaydi | A63H 33/38 |
| 2019/0051031 | A1* | 2/2019 | Chyau | G09B 5/065 |
| 2019/0272143 | A1* | 9/2019 | Tanaka | G10L 13/00 |

FOREIGN PATENT DOCUMENTS

| | | |
|---|---|---|
| CN | 105975169 A | 9/2016 |
| CN | 106780764 A | 5/2017 |

* cited by examiner

METHOD AND APPARATUS FOR PROVIDING 3D READING SCENARIO

CROSS-REFERENCE TO RELATED APPLICATIONS

This application claims priority to Chinese Patent Application No. 201710993954.0, filed with the China National Intellectual Property Administration (CNIPA) on Oct. 23, 2017, the content of which is incorporated herein by reference in its entirety

TECHNICAL FIELD

The present disclosure relates to the field of electronic reading technology, and in particular to a technology for providing a 3D reading scenario to a user.

BACKGROUND

Compared with the traditional paper books, e-books have incomparable advantages, such as low costs, easy availability, large reading spaces, saving resources, and portability. Furthermore, with the continuous improvement of the technology, the e-books will have increasing development potentials, and will eventually gain a broader market. In spare time, the users read the e-books with mobile devices, enabling reading everywhere to become a possibility. However, for most users, at present, the reading scenarios of the e-books are not ideal. The monotonous reading scenario not only fails to bring users into a reading atmosphere, but also more seriously causes certain sense of reading fatigue to users, reduces their reading interests, and greatly affects their reading experiences.

The existing technologies usually predefine a few reading modes, such as a daytime mode, a night mode, and an eye care mode, and then the users choose desired reading modes based on their individual needs. This considers the users' reading needs in different scenarios to some extent, but fails to bring the users into the reading scenario to enable the users to feel as if they are immersed when they are reading. Moreover, because of its monotonous presentation form, the user satisfaction is low.

SUMMARY

An object of the present disclosure is to provide a method, apparatus, mobile device, computer readable storage medium, and a computer program product for providing a 3D reading scenario to a user.

A first aspect of the present disclosure provides a method for providing a 3D reading scenario to a user. The method includes:

acquiring, in a VR reading mode, corresponding 3D scenario information based on a literature work currently read by the user; and establishing, in cooperation with VR glasses, a 3D reading scenario for the literature work based on the 3D scenario information.

A second aspect of the present disclosure further provides an apparatus for providing a 3D reading scenario to a user. The apparatus includes:

a device for acquiring, in a VR reading mode, corresponding 3D scenario information based on a literature work currently read by the user; and a device for establishing, in cooperation with VR glasses, a 3D reading scenario for the literature work based on the 3D scenario information.

A third aspect of the present disclosure further provides a mobile device, including a memory, a processor, and a computer program stored on the memory and capable of running on the processor. The processor implements, when executing the computer program, the method for providing a 3D reading scenario to a user according to an aspect of the present disclosure.

A fourth aspect of the present disclosure further provides a computer readable storage medium, storing a computer program thereon. The computer program implements, when executed by a mobile device, the method for providing a 3D reading scenario to a user according to an aspect of the present disclosure.

A fifth aspect of the present disclosure further provides a computer program product. The computer program product implements, when executed by a mobile device, the method for providing a 3D reading scenario to a user according to an aspect of the present disclosure.

Compared with the existing technologies, the present disclosure can acquire, based on the literature work, the corresponding 3D scenario information thereof, and establish the 3D reading scenario for the literature work using the 3D scenario information. Moreover, the present disclosure further realizes an immersed reading experience of reading literature works in a 3D scenario in cooperation with the VR glasses. This not only improves the monotone disadvantage of the traditional reading scenario, but also brings the user into an immersed reading environment in the reading process, and greatly enhances the user's reading experience.

BRIEF DESCRIPTION OF THE DRAWINGS

By reading and referring to detailed description on the non-limiting embodiments in the following accompanying drawings, other features, objects and advantages of the disclosure will become more apparent.

In the drawings, identical or like reference numerals represent identical or similar components.

DETAILED DESCRIPTION OF EMBODIMENTS

Figure 1:
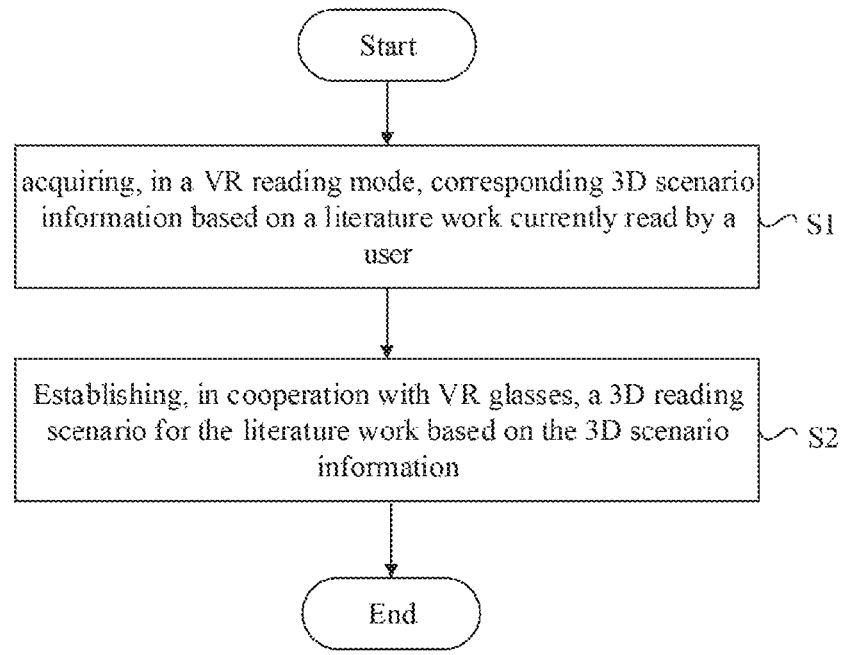
FIG. 1 shows a flow chart of a method for providing a 3D reading scenario to a user according to an embodiment of the present disclosure.

Before discussing exemplary embodiments in more detail, it should be mentioned that some exemplary embodiments are described as processing or methods described in the flow chart. The flow chart describes operations as sequential processing, but many operations thereof may be implemented in parallel, concurrently, or simultaneously. In addition, the sequence of the operations may be rearranged. The processing may be terminated when the operations thereof are completed, but there may also be additional steps that are not included in the drawings. The processing may correspond to a method, a function, a regulation, a subroutine, a subprogram, and so on.

The "computer device" referred to in the context refers to an intelligent electronic device that may execute predetermined processing procedures, such as numerical calculation and/or logical calculation, by running a predetermined program or instruction. The "computer device" may include a processor and a memory, and executes a predetermined processing procedure by executing a program instruction pre-stored in the memory via a processor, or by hardware, such as an ASIC, a FPGA, or a DSP, or by a combination thereof. The computer device includes, but is not limited to, a server, a PC, a notebook computer, a tablet computer, a smart phone, and the like.

The computer device includes, for example, a mobile device and a network device. The mobile device includes, but is not limited to, a tablet computer, a smart phone, a PDA, and the like. The network device includes, but is not limited to, a single network server, a server unit including a plurality of network servers, or a cloud including a large number of computers or network servers based on cloud computing. The cloud computing is a kind of distributed computing, and is a super virtual computer including a set of loosely coupled computers. The computer device may implement the present disclosure by independently running, or by accessing to a network and interactive operation with other computer devices in the network. The network of the computer device includes, but is not limited to, the Internet, WAN, MAN, LAN, VPN network, and so on.

It should be noted that, the mobile device, the network device, and the network are merely examples. Other existing computer devices or computer devices that may arise in the future, if applicable to the present disclosure, should also be included in the scope of protection of the present disclosure, and are incorporated herein by reference.

The methods to be discussed hereinafter, some of which are shown by the flow chart, may be implemented by hardware, software, firmware, middleware, microcode, hardware description language, or any combination thereof. When the methods are implemented by software, firmware, middleware or microcode, program codes or code segments for implementing necessary tasks may be stored in a machine or computer readable medium (such as a storage medium). One or more processors may implement necessary tasks.

The specific structure and function details disclosed here are only representative, and are intended to describe illustrative embodiments of the present disclosure. However, the present disclosure may be specifically implemented through many replacement forms, and should not be construed as only being limited to the embodiments described here.

It should be appreciated that, while the terms "first", "second", or the like may be used here to describe the units, the units should not be limited to the terms. The terms are used only for distinguishing one unit from another unit. For example, a first unit may be referred to as a second unit, and similarly the second unit may be referred to as the first unit, without departing from the scope of the illustrative embodiments. The term "and/or" used here includes any and all combinations of one or more of the listed associated items.

The terms used here are only for describing specific embodiments, and are not intended to limit the illustrative embodiments. Unless otherwise indicated clearly in the context, a singular form "a" or "an" used here is further intended to include a plural form. It should be further appreciated that the terms "include" and/or "comprise" used here provide presence of stated characteristics, integers, steps, operations, units, and/or components without excluding presence or addition of one or more of other characteristics, integers, steps, operations, units, components, and/or combinations thereof.

It should also be mentioned that in some alternative implementations, the mentioned functions/operations may occur in orders different from the orders indicated in the figures. For example, depending on the involved function/operation, two figures that are successively shown may actually be executed simultaneously or sometimes in reverse order.

The present disclosure may be implemented in a mobile device terminal. The mobile device includes a handheld electronic product capable of human-computer interaction with a user through an input device, such as a keyboard, a virtual keyboard, a touch pad, a touch screen, and a voice control device, such as a smart phone, a tablet computer, and a handheld reader. The smart phone includes any mobile phone based on an intelligent operating system. The intelligent operating system includes, but is not limited to, any operating system providing a variety of mobile applications (Application, APP for short) to the mobile device to enrich functions of the device, such as an Android, an IOS, and a Windows Phone. A handheld reader may be, e.g., a kindle reader of Amazon, and Hanvon e-book.

Typically, the present disclosure is implemented by an electronic reader in a mobile device. The electronic reader refers to any APP that has a function of reading e-books or plugin installed into the APP, such as various novel readers or novel reader plugins in browsers. To facilitate description, unless otherwise specially indicated, mobile devices herein are equivalent to electronic readers.

The present disclosure is further described in detail below in conjunction with the accompanying drawings.

FIG. 1 shows a flow chart of a method according to an embodiment of the present disclosure, which specifically shows a process of providing a 3D reading scenario to a user.

As shown in FIG. 1, in step S1, an electronic reader acquires, in a VR reading mode, corresponding 3D scenario information based on a literature work currently read by a user; and in step S2, the electronic reader establishes, in cooperation with VR glasses, a 3D reading scenario of the literature work based on the 3D scenario information.

Specifically, in step S1, the electronic reader acquires, in the VR reading mode, the corresponding 3D scenario information based on the literature work currently read by the user in the VR reading mode.

The 3D scenario information may form the 3D reading scenario through the VR glasses.

Preferably, the electronic reader may further acquire a corresponding audio file based on the literature work currently read by the user, for use in the 3D reading scenario.

The audio file may be more targetedly acquired. When the literature work corresponds to a piece of music, the electronic reader may directly use the corresponding piece of music as the audio file of the literature work.

Some literature works are lyrics of music, such as Song poems and Yuan poetries. When a user is reading a Song poem or Yuan poetry, the electronic reader simultaneously plays the corresponding music, which can significantly improve the user's reading experience.

For example, when a user is currently reading an allusion story "*Mountain Stream*", the electronic reader acquires the music *Mountain Stream* corresponding to the allusion. For example, the music *Mountain Stream* includes Guzheng music, Guqin music, and the like, which may be selected by the user or determined by the electronic reader based on a variety of sorting algorithms.

Furthermore, some literature works correspond to film and television works adapted therefrom. In this case, the electronic reader may also use the music in the film and television works as the audio files corresponding to the literature works.

For example, a user is currently reading a novel *Candle in the Tomb: The Ruins of One Ancient City*. The electronic reader finds out a film and television work *Candle in the Tomb: The Ruins of One Ancient City* corresponding thereto, and uses the ending song of the TV play *Candle in the Tomb: The Ruins of One Ancient City* as the audio file corresponding to the novel *Candle in the Tomb: The Ruins of One Ancient City*.

Alternatively, if the literature work currently read by the user does not have a corresponding film and television work, the electronic reader may determine an audio file corresponding to the literature work based on the category of the literature work, such as a theme song of a film and television work corresponding to other literature work of the same category.

Here, the electronic reader acquires, based on the literature work currently read by the user, the corresponding 3D scenario information by querying a 3D scenario information base.

The 3D scenario information base is used for storing the 3D scenario information of literature works. Therefore, each literature work may correspond to one or more pieces of 3D scenario information. Alternatively, literature works may be categorized, to enable each category to correspond to one or more pieces of 3D scenario information.

The 3D scenario information base may be stored locally in a mobile device, or stored in a network. Alternatively, a small 3D scenario information base is locally maintained, and a complete 3D scenario information base is stored at the network to update the local 3D scenario information base or accept updating of the network 3D scenario information base by the local 3D scenario information base.

For example, popular literature works or 3D scenario information of popular categories is stored in the local 3D scenario information base. For these literature works, the electronic reader may acquire corresponding 3D scenario information directly from the local 3D scenario information base. For literature works or categorized 3D scenario information that is not stored in the local 3D scenario information base, the electronic reader may acquire 3D scenario information corresponding thereto from the network 3D scenario information base.

Therefore, the 3D scenario information acquired from the network 3D scenario information base may be stored and updated into the local 3D scenario information base. In addition, when new popular literature works or popular categories arise, the local 3D scenario information base may also acquire 3D scenario information corresponding thereto from the network 3D scenario information base for updating. The local 3D scenario information base may also record 3D scenario information actually used by each literature work or category, and upload relevant information about the use of the 3D scenario information to the network 3D scenario information base, to facilitate the network 3D scenario information base collecting a use frequency of each piece of 3D scenario information and an association between the each piece of 3D scenario information and a literature work or category.

Preferably, for a literature work or a category having pieces of 3D scenario information, the electronic reader may update 3D scenario information corresponding thereto when jumping between chapters.

When reading different chapters of a literature work, 3D scenario information corresponding thereto may be updated, to acquire different 3D scenario information for different chapters, and then further enhance the user's reading experience.

For example, a literature work corresponds to pieces of 3D scenario information, and when a chapter changes, for example, a current chapter is turned to a next chapter, the electronic reader establishes a 3D reading scenario 1 for the current chapter based on 3D scenario information 1, and establishes a 3D reading scenario 2 for the next chapter based on 3D scenario information 2.

For another example, a literature work corresponds to a plurality of categories, and each of the categories corresponds to a piece of 3D scenario information. When a current chapter is turned to a next chapter, the electronic reader may establish a 3D reading scenario 1 for the current chapter based on 3D scenario information 1 of a category 1, and establish a 3D reading scenario 2 for the next chapter based on 3D scenario information 2 of a category 2.

Here, it should be noted that as should be appreciated by those skilled in the art, the method of updating corresponding 3D scenario information based on different chapters of a literature work is not limited to the above examples, and any update method applicable to the present disclosure shall be included in the scope of patent protection of the disclosure.

Furthermore, when a literature work corresponds to pieces of 3D scenario information, the matched 3D scenario information may be graded, and in general, the higher grades correspond to the later chapters.

For example, when a user is reading a detective suspense novel, the electronic reader may select a piece of common 3D scenario information for the first chapter of the literature work. With the development of the chapter, the storyline of the literature work will also have corresponding layer-by-layer progressive, fluctuating and gripping changes. In this case, the electronic reader should set in-depth 3D scenario information complying more with the theme for a subsequent chapter, to enable the 3D scenario information to match the development of the storyline. Preferably, the electronic reader may provide all 3D scenario information complying with detective suspense novels to the user, to facilitate the user to choose therefrom. The user may filter and grade the provided 3D scenario information for use in an actual reading scenario.

Furthermore, the 3D scenario information may also be selected based on popularity, downloads, favorites, score, relevance, and the like.

For example, when a user is reading a supernatural suspense novel, the electronic reader may sort the matched 3D scenario information based on the "relevance" index, in order to better match different chapters of the literature work.

Literature works may be divided into works of styles, such as drama, poetry, fiction, and prose, based on different themes. For novels, based on different starting points and perspectives thereof, the novels may be categorized according to many categorization methods. For example, novels are divided into long novels, intermediate novels, and short novels based on the length, word count, and volume; novels may be divided into lyrical novels, story novels, and the like based on the nature and the main way to shape the image; novels may be divided into narrative novels, biographical novels, and the like based on the theme and representation form; novels may be divided into many categories, such as historical novels, love novels, martial arts novels, mysteries, fantasy novels, magical novels, science novels, suspense novels, detective novels, whodunits, fan novels, urban novels, time travel novels, and harem novels, based on the reflected theme and subject area.

In the present disclosure, how to categorize literature works is not limited, and it is only necessary to establish a 3D scenario information base based on different categories.

For example, when a user is reading a novel, the category of the current novel is a fantasy novel based on the theme, and then the 3D scenario information acquired in this case is 3D scenario information of a fantasy category.

In step S2, the electronic reader establishes, in cooperation with the VR glasses, a 3D reading scenario of the literature work based on the 3D scenario information corresponding to the literature work.

In a VR reading scenario, the user needs to wear VR glasses, and the electronic reader transfers the 3D scenario information determined based on materials to the VR glasses, to enable the VR glasses to project a 3D scenario based on the 3D scenario information.

For example, when a user is currently reading Tao Yuanming's idyll *Drinking*, the VR glasses may establish a 3D reading scenario of a little hut based on 3D scenario information corresponding thereto, to enable the user to seem to read a poetry in Tao Yuanming's thatched cottage.

In particular, considering that after putting the mobile phone into the VR glasses, it is not convenient for the user to click the phone screen any more, therefore before entering the VR reading, the user may preset reading function parameters.

The reading function parameters at least include one of following parameters:

1) a page turning interval; or

Here, the page turning interval may adopt a default setting. The default setting may be further distinguished based on different types of literature works. Alternatively, the page turning interval may be set based on the current user, such as set based on the user's historical reading speed, or set based on on-site testing of the user's reading speed.

For example, the page turning interval may be set through testing the user's reading speed on-site. The setting of the page turning interval should also take into consideration that the reading speed of different types of literature works will be different to some extent. There, these differences should be considered during sampling. Specifically, for example, literature works of humorous themes have simple storylines, and will be read at a relatively faster speed. In this case, a relatively short page turning interval may be set. As another example, literature works of suspense science theme have complex storylines, and are difficult to be understood. In this case, the reading speed should be slowed down, to achieve reading the literature works in a better and higher quality. In particular, when a user is reading a literature work of a poetry category, relatively speaking, such literature works have refined contents, and small word counts, and it is very easy to set a short page turning interval, which will lead to failure to more deeply understand the profound meaning of poetry in a short time, thereby affecting the user's reading experience.

Furthermore, the page turning interval may also be set by users. For example, some users like intensive reading of every paragraph, and like to measure every word. In this case, a larger page turning interval may be set. On the contrary, other users like browse reading, and read very fast. In this case, it is necessary to set a shorter page turning interval.

2) a font size.

For example, when a user is reading a literature work having a small word count, such as an ancient poem, the electronic reader may set a relatively large font, to facilitate appreciating, measuring and tasting the literature work.

When a user is reading a long literature work, the electronic reader may set a relatively small font, to prevent the phenomenon of visual fatigue caused by frequent page turning.

Furthermore, when acquiring an audio file of a literature work, the electronic reader further needs to perform corresponding play setting operation on the audio file.

Here, the play setting operation at least may include following aspects:

1) setting whether to play audio files, i.e., despite that a literature work corresponds to an audio file, the audio file does not necessarily have to be played;

2) setting the audio file play mode, for example, including whether loop play is required, and start and end time of play; and 3) setting the play volume of the audio file.

As an example, some users have high requirements on the quietness of the reading environment, and likes a quiet read scenario. In this case, the audio file may be set to be closed. On the contrary, some users care more about the reading environment in which emotion and scenario are integrated. For example, when reading the allusion story *Mountain Stream*, the user prefers reading in a reading scenario configured with the music *Mountain Stream*. Then, in this case, the audio file may be set to play, or even the time period of playing the audio may be set based on the user's individual needs. For example, when a user is reading the literature work *Candle in the Tomb*, it may be set to play the audio in a climax of the literature work, and the volume of the audio information may be set based on fluctuations of the storyline of the literature work, thereby practically bringing the user to a reading environment in which emotion and scenario are integrated, and bringing more abundant reading experience to the user. Furthermore, by still referring to FIG. 1, the electronic reader may further need to calibrate the VR glasses before entering the VR reading mode.

To adapt to different VR glasses, the electronic reader needs to calibrate the VR glasses used by the user before entering the VR reading mode.

The VR glasses include, for example, an external headset device, an integrated headset device, and a mobile terminal head mounted display device. The mobile terminal head mounted display device is frequently used by users due to its simple structure and low price, and it can be conveniently used only by putting in a mobile phone.

Based on the present disclosure, according to a literature work currently read by a user, the electronic reader can establish, in cooperation with the VR glasses, a 3D reading scenario based on the 3D scenario information corresponding to the literature work. On the one hand, this can dynamically update scenario information based on current reading of a user, which increases his interests and improves his reading experience, and the provided 3D scenario information can reflect possible needs of the user of the present time, to facilitate the user achieving his needs through the scenario, thereby greatly enhancing the user satisfaction; and on the other hand, the method of updating the 3D scenario information can provide a new way to push information, the way will not annoy the user but easily causes the user to resonate, the way can provide the users with great conveniences, and is easily accepted by the users and popularized among the users.

Figure 2:
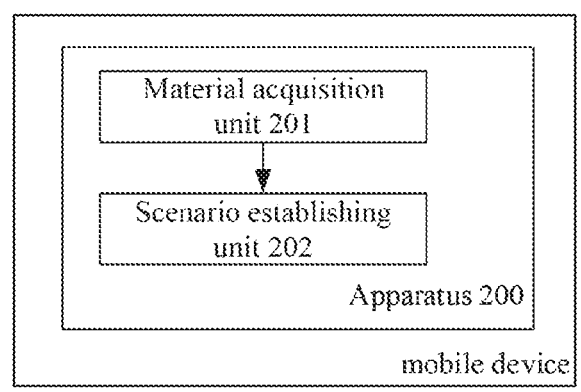
FIG. 2 shows a schematic diagram of an apparatus for providing a 3D reading scenario to a user according to an embodiment of the present disclosure.

FIG. 2 shows a schematic diagram of an apparatus according to an embodiment of the present disclosure, which specifically shows an apparatus for providing a 3D reading scenario to a user. Typically, the apparatus 200 for providing a 3D reading scenario to a user is an electronic reader.

As shown in FIG. 2, the apparatus 200 includes a material acquisition unit 201 and a scenario establishing unit 202. The material acquisition unit 201 acquires corresponding 3D scenario information based on a literature work currently read by a user in a VR reading mode; and the scenario establishing unit 202 establishes, in cooperation with the VR glasses, a 3D reading scenario of the literature work based on the 3D scenario information.

Specifically, the material acquisition unit 201 acquires corresponding 3D scenario information based on the literature work currently read by the user in the VR reading mode.

The 3D scenario information may form the 3D reading scenario through the VR glasses.

Preferably, the material acquisition unit 201 or other device (not shown in FIG. 2) in the apparatus 200 may further acquire a corresponding audio file based on the literature work currently read by the user, for use in the 3D reading scenario.

The audio file may be more targetedly acquired. When the literature work corresponds to a piece of music, the material acquisition unit 201 may directly use the corresponding music as the audio file of the literature work.

Some literature works are lyrics of music, such as Song poems, and Yuan poetries. When a user is reading a Song poem or a Yuan poetry, the material acquisition unit 201 simultaneously plays the corresponding music, which can significantly improve the user's reading experience.

For example, when a user is currently reading an allusion story *Mountain Stream*, the material acquisition unit 201 acquires the music Mountain Stream corresponding to the allusion. For example, the music *Mountain Stream* includes Guzheng music, Guqin music, and the like, which may be selected by the user or determined by the material acquisition unit 201 based on a variety of sorting algorithms.

Furthermore, some literature works correspond to film and television works adapted therefrom. In this case, the material acquisition unit 201 may also use the music in the film and television works as the audio files corresponding to the literature works.

For example, a user is currently reading a novel *Candle in the Tomb: The Ruins of One Ancient City*. The material acquisition unit 201 finds out a film and television work *Candle in the Tomb: The Ruins of One Ancient City* corresponding thereto, and uses the ending song of the TV play *Candle in the Tomb: The Ruins of One Ancient City* as the audio file corresponding to the novel *Candle in the Tomb: The Ruins of One Ancient City*.

Alternatively, if the literature work currently read by the user does not have a corresponding film and television work, the material acquisition unit 201 may determine an audio file corresponding to the literature work based on the category of the literature work, such as a theme song of a film and television work corresponding to other literature work of the same category.

Here, the material acquisition unit 201 acquires the corresponding 3D scenario information by querying a 3D scenario information base based on the literature work currently read by the user.

The 3D scenario information base is used for storing the 3D scenario information of literature works. Therefore, each literature work may correspond to one or more pieces of 3D scenario information. Alternatively, literature works may be categorized, to enable each category to correspond to one or more pieces of 3D scenario information.

The 3D scenario information base may be stored locally in a mobile device, or stored in a network. Alternatively, a small 3D scenario information base is locally maintained, and a complete 3D scenario information base is stored at the network terminal to update the local 3D scenario information base or accept updating of the network 3D scenario information base by the local 3D scenario information base.

For example, popular literature works or 3D scenario information of popular categories is stored in the local 3D scenario information base. For these literature works, the material acquisition unit 201 may acquire corresponding 3D scenario information directly from the local 3D scenario information base. For literature works or categorized 3D scenario information that is not stored in the local 3D scenario information base, the material acquisition unit 201 may acquire 3D scenario information corresponding thereto from the network 3D scenario information base.

Therefore, the 3D scenario information obtained from the network 3D scenario information base may be stored and updated in the local 3D scenario information base. In addition, when new popular literature works or popular categories arise, the local 3D scenario information base may also obtain 3D scenario information corresponding thereto from the network 3D scenario information base for updating. The local 3D scenario information base may also record 3D scenario information actually used by each literature work or category, and upload relevant information about the use of the 3D scenario information to the network 3D scenario information base, to facilitate the network 3D scenario information base collecting a use frequency of each piece of 3D scenario information and an association degree between the each piece of 3D scenario information and a literature work or category.

Preferably, for a literature work or category having pieces of 3D scenario information, the material acquisition unit 201 may update 3D scenario information corresponding thereto when jumping between chapters.

When reading different chapters of a literature work, 3D scenario information corresponding thereto may be updated, to acquire different 3D scenario information for different chapters, and then further enhance the user's reading experience.

For example, a literature work corresponds to pieces of 3D scenario information, and when a chapter changes, for example, a current chapter is turned to a next chapter, the material acquisition unit 201 establishes a 3D reading scenario 1 for the current chapter based on 3D scenario information 1, and establishes a 3D reading scenario 2 for the next chapter based on 3D scenario information 2.

For another example, a literature work corresponds to a plurality of categories, and each of the categories corresponds to a piece of 3D scenario information. When a current chapter is turned to a next chapter, the material acquisition unit 201 may establish a 3D reading scenario 1 for the current chapter based on 3D scenario information 1 of a category 1, and establish a 3D reading scenario 2 for the next chapter based on 3D scenario information 2 of a category 2.

Here, it should be noted that as should be appreciated by those skilled in the art, the method of updating corresponding 3D scenario information based on different chapters of a literature work is not limited to the above examples, and any update method applicable to the present disclosure shall be included in the scope of patent protection of the disclosure.

Furthermore, when a literature work corresponds to pieces of 3D scenario information, matched 3D scenario information may be graded, and in general, the higher grades correspond to the later chapters.

For example, when a user is reading a detective suspense novel, the material acquisition unit 201 may select a piece of common 3D scenario information for the first chapter of the literature work. With the development of the chapter, the storyline of the literature work will also have corresponding layer-by-layer progressive, fluctuating and gripping changes. In this case, the material acquisition unit 201 should set in-depth 3D scenario information complying more with the theme for a subsequent chapter, to enable the 3D scenario information to match the development of the storyline. Preferably, the material acquisition unit 201 may provide all 3D scenario information complying with detective suspense novels to the user, to facilitate the user to choose therefrom. The user may filter and grade the provided 3D scenario information for use in an actual reading scenario.

Furthermore, the 3D scenario information may also be selected based on popularity, downloads, favorites, score, relevance, and the like.

For example, when a user is reading a supernatural suspense novel, the material acquisition unit 201 may sort matched 3D scenario information based on the "relevance" index, in order to better match different chapters of the literature work.

Literature works may be divided into works of styles, such as drama, poetry, fiction, and prose, based on different themes. For novels, based on different starting points and perspectives thereof, the novels may be categorized according to many categorization methods. For example, novels are divided into long novels, intermediate novels, and short novels based on the length, word count, and volume; novels may be divided into lyrical novels, story novels, and the like based on the nature and the main way to shape the image; novels may be divided into narrative novels, biographical novels, and the like based on the theme and representation form; novels may be divided into many categories, such as historical novels, love novels, martial arts novels, mysteries, fantasy novels, magical novels, science novels, suspense novels, detective novels, whodunits, fan novels, urban novels, time travel novels, and harem novels, based on the reflected theme and subject area.

In the present disclosure, how to categorize literature works is not limited, and it is only necessary to establish a 3D scenario information base based on different categories.

For example, when a user is reading a novel, the category of the current novel is a fantasy novel based on the theme, and then the 3D scenario information acquired in this case is 3D scenario information of a fantasy category.

Then, the scenario establishing unit 202 establishes, in cooperation with the VR glasses, a 3D reading scenario of the literature work based on the 3D scenario information corresponding to the literature work.

In a VR reading scenario, the user needs to wear VR glasses, and the scenario establishing unit 202 transfers the 3D scenario information determined based on the material acquisition unit 201 to the VR glasses, to enable the VR glasses project a 3D scenario based on the 3D scenario information.

For example, when a user is currently reading Tao Yuanming's idyll *Drinking*, the VR glasses may establish a 3D reading scenario of a little hut based on 3D scenario information corresponding thereto, to enable the user to seem to read a poem in Tao Yuanming's thatched cottage.

In particular, considering that after putting the mobile phone into the VR glasses, it is not convenient for the user to click the phone screen any more, therefore before entering the VR reading, the user may preset reading function parameters. Therefore, the apparatus 200 may further include a parameter setting device (not shown in FIG. 2).

The reading function parameters at least include one of following parameters:

1) a page turning interval; or

Here, the page turning interval may adopt a default setting. The default setting may be further distinguished based on different types of literature works. Alternatively, the page turning interval may be set based on the current user, such as set based on the user's historical reading speed, or set based on on-site testing of the user's reading speed.

For example, the page turning interval may be set through on-site testing the user's reading speed. The setting of the page turning interval should also take into consideration that the reading speed of different types of literature works will be different to some extent. There, these differences should be considered during sampling. Specifically, for example, literature works of humorous themes have simple storylines, and will be read at a relatively faster speed. In this case, a relatively short page turning interval may be set. As another example, literature works of suspense science theme have complex storylines, and are difficult to be understood. In this case, the reading speed should be slowed down, to achieve reading the literature works in a better and higher quality. In particular, when a user is reading a literature work of a poetry category, relatively speaking, such literature works have refined contents, and small word counts, and it is very easy to set a short page turning interval, which will lead to failure to more deeply understand the profound meaning of poetry in a short time, thereby affecting the user's reading experience.

Furthermore, the page turning interval may also be set by users. For example, some users like intensive reading of every paragraph, and like to measure every word. In this case, a larger page turning interval may be set. On the contrary, other users like browse reading, and read very fast. In this case, it is necessary to set a shorter page turning interval.

2) a font size.

For example, when a user is reading a literature work having a small word count, such as an ancient poem, the parameter setting device may set a relatively large font, to facilitate appreciating, measuring and tasting the literature work. When a user is reading a long literature work, the parameter setting device may set a relatively small font, to prevent the phenomenon of visual fatigue caused by frequent page turning.

Furthermore, when the literature work corresponds to a piece of music, the parameter setting device further needs to perform corresponding play setting operation on the audio file.

Here, the play setting operation at least may include following aspects:

1) setting whether to play audio files, i.e., despite that a literature work corresponds to an audio file, the audio file does not necessarily have to be played;

2) setting the audio file play mode, for example, including whether loop play is required, and begin and end time of play; and 3) setting the play volume of the audio file.

As an example, some users have high requirements on quietness of the reading environment, and likes a quiet read scenario. Then in this case, the audio file may be set to be closed. On the contrary, some users care more about the reading environment in which emotion and scenario are integrated. For example, when reading the allusion story *Mountain Stream*, the user prefers reading in a reading scenario configured with the music *Mountain Stream*. Then, in this case, the audio file may be set to play, or even the time period of playing the audio may be set based on the user's individual needs. For example, when a user is reading the literature work *Candle in the Tomb*, it may be set to play the audio in a climax of the literature work, and the volume of the audio information may be set based on fluctuations of the storyline of the literature work, thereby practically bringing the user to a reading environment in which emotion and scenario are integrated, and bringing more abundant reading experience to the user.

In addition, the apparatus 200 may further include a VR calibration device (not shown in FIG. 2), and the VR calibration device may further need to calibrate the VR glasses before entering the VR reading mode.

To adapt to different VR glasses, the VR calibration device needs to calibrate the VR glasses used by the user before entering the VR reading mode.

The VR glasses include, for example, an external headset device, an integrated headset device, and a mobile terminal head mounted display device. The mobile terminal head mounted display device is frequently used by users due to its a simple structure and low price, and it can be conveniently used only by putting in a mobile phone.

Based on the present disclosure, according to a literature work currently read by a user, the electronic reader can establish, in cooperation with the VR glasses, a 3D reading scenario based on the 3D scenario information corresponding to the literature work. On the one hand, this can dynamically update scenario information based on current reading of a user, which increases his interests and improves his reading experience, and the provided 3D scenario information can reflect possible needs of the user at present, to facilitate the user achieving his needs through the scenario, thereby greatly enhancing the user satisfaction; and on the other hand, the method of updating the 3D scenario information can provide a new way to push information, the way will not annoy the user but extremely easily causes the user to resonate, the way can provide the users with great conveniences, and is very easily accepted by the users and popularized among the users.

For those skilled in the art, it is apparent that the disclosure is not limited to details of the above illustrative embodiments, and the present disclosure can be implemented in other concrete forms without departing from the spirit or essential characteristics of the disclosure. Therefore, as can be seen from whichever perspective, the embodiments should be considered exemplary and non-limiting, and the scope of the present disclosure is defined by the appended claims, rather than by the foregoing description. Therefore, the present disclosure is intended to cover all variations falling within the meaning and scope of equivalents of the appended claims. Any reference numeral in the claims should not be considered as limiting the involved claim. Furthermore, it is apparent that the term "include" does not exclude other units or steps, and a singular form does not exclude a plural form. A plurality of units or devices stated in the system claims may also be implemented by a unit or device through software or hardware. The term, such as first, and second, is used for denoting a name, rather than any particular order.

What is claimed is:

1. A method for providing a three-dimensional (3D) reading scenario, comprising:
   acquiring, in a virtual reality (VR) reading mode, corresponding 3D scenario information based on a literature work currently read by a user, wherein the 3D scenario information is determined based on a category of the literature work; and
   establishing, in cooperation with VR glasses, a 3D reading scenario for the literature work based on the 3D scenario information,
   wherein the 3D scenario information is acquired from a 3D scenario information base, the 3D scenario information base comprises: a local 3D scenario information base maintained locally and a network 3D scenario information base stored at a network side,
     wherein the local 3D scenario information base is configured to: record 3D scenario information actually used by each literature work or category, and upload relevant information about the use of the 3D scenario information to the network 3D scenario information base; and
     the network 3D scenario information base is configured to: count, based on said relevant information received from the local 3D scenario information base, the use frequency of each piece of 3D scenario information and the association degree between the each piece of 3D scenario information and the category of the literature work.

2. The method according to claim 1, wherein the 3D scenario information is updated based on different chapters of the literature work.

3. The method according to claim 1, further comprising: acquiring a corresponding audio file based on the literature work.

4. The method according to claim 1, further comprising: configuring a reading function parameter of the 3D reading scenario.

5. The method according to claim 4, wherein the reading function parameter comprises:
   a page turning interval.

6. The method according to claim 1, wherein before entering the VR reading mode, the method further comprises:
   calibrating the VR glasses.

7. The method according to claim 1, wherein when the literature work corresponds to pieces of 3D scenario information, grading the pieces of 3D scenario information, and matching a piece of 3D scenario information to a chapter of the literature work according to grades.

8. The method according to claim 1, wherein the category of the literature work comprises at least one of:
   history, love, martial arts, mysteries, fantasy, magic, science, suspense, detective, whodunits, urban, or time-travel.

9. The method according to claim 1, wherein the local 3D scenario information base is updated based on the network 3D scenario information base, and the network 3D scenario information base is updated based on the local 3D scenario information base.

10. An apparatus for providing a three-dimensional (3D) reading scenario, comprising:
    at least one processor; and
    a memory storing instructions, the instructions when executed by the at least one processor, cause the at least one processor to perform operations, the operations comprising:
    acquiring, in a virtual reality (VR) reading mode, corresponding 3D scenario information based on a literature work currently read by a user, wherein the 3D scenario information is determined based on a category of the literature work; and establishing, in cooperation with VR glasses, a 3D reading scenario for the literature work based on the 3D scenario information, wherein the 3D scenario information is acquired from a 3D scenario information base, the 3D scenario information base comprises: a local 3D scenario information base maintained locally and a network 3D scenario information base stored at a network side, wherein the local 3D scenario information base is configured to: record 3D scenario information actually used by each literature work or category, and upload relevant information about the use of the 3D scenario information to the network 3D scenario information base; and the network 3D scenario information base is configured to: count, based on said relevant information received from the local 3D scenario information base, the use frequency of each piece of 3D scenario information and the association degree between the each piece of 3D scenario information and the category of the literature work.

11. The apparatus according to claim 10, wherein the 3D scenario information is updated based on different chapters of the literature work.

12. The apparatus according to claim 10, wherein the operations further comprise:
acquiring a corresponding audio file based on the literature work.

13. The apparatus according to claim 10, wherein the operations further comprise:
configuring a reading function parameter of the 3D reading scenario.

14. The apparatus according to claim 13, wherein the reading function parameter comprises:
a page turning interval.

15. The apparatus according to claim 10, wherein before entering the VR reading mode, the operations further comprise:
calibrating the VR glasses.

16. A non-transitory computer readable storage medium storing a computer program, wherein the computer program, when executed by a processor, cause the processor to perform operations, the operations, comprising:

acquiring, in a virtual reality (VR) reading mode, corresponding three-dimensional (3D) scenario information based on a literature work currently read by a user, wherein the 3D scenario information is determined based on a category of the literature work; and establishing, in cooperation with VR glasses, a 3D reading scenario for the literature work based on the 3D scenario information, wherein the 3D scenario information is acquired from a 3D scenario information base, the 3D scenario information base comprises: a local 3D scenario information base maintained locally and a network 3D scenario information base stored at a network side, wherein the local 3D scenario information base is configured to: record 3D scenario information actually used by each literature work or category, and upload relevant information about the use of the 3D scenario information to the network 3D scenario information base; and the network 3D scenario information base is configured to: count, based on said relevant information received from the local 3D scenario information base, the use frequency of each piece of 3D scenario information and the association degree between the each piece of 3D scenario information and the category of the literature work.

* * * * *